United States Patent
Chess et al.

(10) Patent No.: US 8,626,569 B2
(45) Date of Patent: Jan. 7, 2014

(54) PERFORMANCE PREDICTION SERVICE USING ENTITY-PROCESS INFORMATION

(75) Inventors: David M. Chess, Mohegan Lake, NY (US); Sophia Krasikov, Katonah, NY (US); Alla Segal, Mount Kisco, NY (US); Senthilnathan Velayudham, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 12/132,799

(22) Filed: Jun. 4, 2008

(65) Prior Publication Data

US 2008/0235080 A1    Sep. 25, 2008

Related U.S. Application Data (63) Continuation of application No. 10/994,923, filed on Nov. 22, 2004, now abandoned.

(51) Int. Cl.
*G06Q 10/00* (2012.01)
*G06Q 30/00* (2012.01)

(52) U.S. Cl.
USPC ........ 705/7.39; 705/7.11; 705/7.29; 705/7.36

(58) Field of Classification Search
USPC ................ 705/7.29–7.32, 7.39; 709/223–238
See application file for complete search history.

(56) References Cited

U.S. PATENT DOCUMENTS

| | | | | |
|---|---|---|---|---|
| 6,026,374 A | * | 2/2000 | Chess | 705/26.41 |
| 6,026,391 A | * | 2/2000 | Osborn et al. | 1/1 |
| 6,069,894 A | * | 5/2000 | Holender et al. | 370/397 |
| 6,078,918 A | * | 6/2000 | Allen et al. | 1/1 |
| 6,108,493 A | * | 8/2000 | Miller et al. | 709/219 |
| 6,205,472 B1 | * | 3/2001 | Gilmour | 709/206 |
| 6,487,541 B1 | * | 11/2002 | Aggarwal et al. | 705/7.29 |
| 6,604,143 B1 | * | 8/2003 | Nagar et al. | 709/229 |
| 7,249,128 B2 | * | 7/2007 | Chess et al. | 707/5 |
| 2002/0049687 A1 | * | 4/2002 | Helsper et al. | 706/45 |
| 2002/0059258 A1 | * | 5/2002 | Kirkpatrick | 707/100 |
| 2002/0107723 A1 | * | 8/2002 | Benjamin et al. | 705/11 |
| 2002/0107853 A1 | * | 8/2002 | Hofmann et al. | 707/7 |
| 2002/0116234 A1 | * | 8/2002 | Nagasawa | 705/5 |
| 2002/0138316 A1 | * | 9/2002 | Katz et al. | 705/7 |
| 2003/0023464 A1 | * | 1/2003 | Burk | 705/7 |
| 2003/0033298 A1 | | 2/2003 | Sundaresan | |
| 2003/0033299 A1 | | 2/2003 | Sundaresan | |

(Continued)

OTHER PUBLICATIONS

Karma2:Provenance Management for Data-Driven Workflows1 Yogesh L Simmhan, Beth Plale, Dennis Gannon. International Journal of Web Services Research. Hershey: Apr.-Jun. 2008. vol. 5, Iss. 2; p. 1, 22 pgs.*

(Continued)

*Primary Examiner* — Alan S Miller
(74) *Attorney, Agent, or Firm* — Louis Percello; Ryan, Mason & Lewis, LLP (57) ABSTRACT

Performance prediction techniques are provided that utilize business-process information such as transaction history and log information. For example, in one aspect of the invention, a computer-based technique for providing a performance prediction service comprises the following steps/operations. First, business-process information associated with a business is obtained. Then, a performance estimation function is generated based at least in part on the business-process information, the performance estimation function being usable in responding to a query obtained from a potential customer of the business.

11 Claims, 6 Drawing Sheets

(56) References Cited

U.S. PATENT DOCUMENTS

| | | | |
|---|---|---|---|
| 2003/0050814 A1* | 3/2003 | Stoneking et al. | 705/7 |
| 2003/0083947 A1* | 5/2003 | Hoffman et al. | 705/22 |
| 2004/0117241 A1* | 6/2004 | Krasikov et al. | 705/11 |
| 2008/0235080 A1 | 9/2008 | Chess et al. | |

OTHER PUBLICATIONS

E-business and management science: Mutual impacts (Part 1 of 2) Arthur M Geoffrion, Ramayya Krishnan. Management Science. Linthicum: Oct. 2003. vol. 49, Iss. 10; p. 1275.*

"Analysis of large data logs: an application of Poisson sampling on excite web queries"; H. Cenk Ozmutlu, Amanda Spink, Seda Ozmutlu; Information Processing and Management 38 (2002) 473-490.*

"Combining evidence for automatic Web session identification"; Daqing He, Ayşe Göker, David J. Harper; Information Processing and Management 38 (2002) 727-742.*

"A novel Web usage mining approach for search engines"; Dell Zhang, Yisheng Dong; Computer Networks 39 (2002) 303-310.*

G.T. Albanis et al., "Five Classification Algorithms to Predict High Performance Stocks," pp. 1-19, 1999.

H. Jonkers, "The Application of Hybrid Modelling Techniques for Business Process Performance Analysis," 8 pages, 1997.

D.A. Bacigalup et al., "An Investigation into the Application of Different Performance Prediction Techniques to e-Commerce Applications," Proceedings of the 18th International Parallel and Distributed Processing Symposium (IPDPS'04), 8 pages, Apr. 2004.

U.S. Appl. No. 10/635,728, filed Aug. 5, 2003, David M. Chess.

U.S. Appl. No. 10/317,300, filed Dec. 12, 2002, David M. Chess.

Y.L. Simmhan et al., "Karma2: Provenance Management for Data-Driven Workflows," International Journal of Web Services Research, 2008, pp. 1-22, vol. 5, No. 2.

* cited by examiner

5A — ACCUMULATION OF INFORMATION

5B — REQUEST PROCESSING

FIG. 6A

BACKORDER (SUPPLIER B)

| BUYER | VOLUME/MONTH | BACKORDERS | % (BACKORDERS/VOLUME) |
|-------|--------------|------------|------------------------|
| A1    | 1000         | 100        | 10                     |
| A2    | 2000         | 180        | 9                      |
| A3    | 3000         | 250        | 8.3                    |
| A4    | 4000         | 380        | 9.5                    |
| A5    | 5000         | 490        | 9.8                    |
| A6    | 6000         | 550        | 9.1                    |
| A7    | 7000         | 100        | 1.4                    |
| A8    | 8000         | 50         | 1.5                    |
| A9    | 9000         | 50         | 0.5                    |
| A10   | 10000        | 0          | 0                      |
| A11   | 12000        | 0          | 0                      |

FIG. 6B

%(BACKORDERS) = F(VOLUME)

VOLUME*1000

PERFORMANCE PREDICTION SERVICE USING ENTITY-PROCESS INFORMATION

CROSS-REFERENCE TO RELATED APPLICATION(S)

This application is a continuation of pending U.S. application Ser. No. 10/994,923 filed on Nov. 22, 2004, the disclosure of which is incorporated herein by reference.

FIELD OF THE INVENTION

The present invention generally relates to performance prediction techniques and, more particularly, to performance prediction techniques that utilize business-process information such as transaction history and log information.

BACKGROUND OF THE INVENTION

Existing reputation and performance prediction services and systems (including, for example, the Better Business Bureau in the offline world, OpenRatings and the eBay.com rating systems online) allow users to retrieve information about the reputation of businesses, or the likely success of a transaction, by sending queries of various kinds to the system, and receiving responses. Currently known systems are based on the post-fact reputation-related information (solicited and unsolicited) that is supplied to them by participants/users. Efforts are being made by companies and individuals to provide methods and systems that can rate businesses performance and, in some limited cases, predict performance.

For example, U.S. patent publication nos. US20030033298A1 and US20030033299A1 (both filed in the name of Sundaresan et al.) disclose systems and methods for integrating on-line and off-line user ratings of businesses, which are relevant to a given Internet search topic with search engines. Both U.S. patent publications disclose that the businesses' ratings are compiled from off-line and on-line surveys provided by a third party. However, performance prediction techniques are not disclosed.

Open Ratings (Waltham, Mass.) is a leading supply management organization which provides technology to predict performance of a supplier based on historical supplier trends, socioeconomic data, financial information, major events, users' assessments, questionnaires and comments. Their latest product, the SBManager, safeguards suppliers from the manipulation of results. Though performance prediction is part of the technology, the list of resources used for performance prediction does not contain internal logs and internal business process information.

Other efforts in this area are limited to information tracking. These efforts generally fall into two categories: (i) systems that track business operational data related to sales, production, logistics, financial operations in order to spot business problems more effectively (i.e., business activity management or BAM); or (ii) systems that track service level agreement (SLA) compliance of service providers in order to keep current customers satisfied.

Various companies are providing BAM products. One of the products, Celequest 2.0 (developed by Celequest Corporation of Redwood City, Calif.), captures business events as they occur and combines them with related operational and historical data to provide a real-time data matrix. This approach allows systems to ease the process of finding problems and notifying the right people about them. Another product is Vigilys developed by Polexis (San Diego, Calif.). Vigilys is oriented toward defense and homeland security. It uses BAM concepts to manage crisis situations in real time. The products mentioned above, as well as other BAM products, process business events as they occur and automatically share the information the events produce with the interested parties. However, such products do not use the events and information for performance prediction.

Currently, Cisco Systems (San Jose, Calif.) offers a product known as Pulsar xSP that allows a service provider to know how a service is performing in real-time. Pulsar is a policy-based service level compliance platform designed specifically to monitor hosted applications from the end-user perspective. This product helps a service provider to keep existing customers satisfied. It does not use the data thus gathered to make predictions about probable future behavior.

Similarly, a product known as ServiceFlow (developed by DigitalFuel of San Mateo, Calif.) offers Performance SLA Management Software that provides tools to track and audit SLAs for providers and customers.

Both Pulsar and ServiceFlow track performance of an offered service. They are not designed for prediction of performance based on the real-time data that they gather.

Cable and Wireless plc. (United Kingdom) provides a daily or monthly summary of its SLA compliance data on its web page, but it does not use this data to predict probable future behavior.

Third-party verification of a service provider's performance for a particular customer is offered by Keynote Systems (San Mateo, Calif.). Their product, SLA Perspective, offers independent SLA verification of performance of content delivery networks (CDN), Internet service providers, and Web hosting companies.

BAM products utilize real-time data to track a business and spot business problems more effectively. Products like Pulsar xSP, ServiceFlow and Keynote SLA Perspective allow SLA tracking and SLA compliance verification. However, none of these existing products are capable of providing effective performance prediction services.

SUMMARY OF THE INVENTION

The present invention provides performance prediction techniques that utilize business-process information such as transaction history and log information.

For example, in one aspect of the invention, a computer-based technique for providing a performance prediction service comprises the following steps/operations. First, business-process information associated with a business is obtained. Then, a performance estimation function is generated based at least in part on the business-process information, the performance estimation function being usable in responding to a query obtained from a potential customer of the business.

Post-fact reputation information associated with the business may be obtained. The post-fact reputation information may be used, alone or in combination with the business-process information, to generate the performance estimation function. The step/operation of obtaining post-fact reputation information may further comprise obtaining such information from one or more prior clients of the business.

The step/operation of obtaining business-process information may further comprise obtaining such information from the business in real-time or offline. Such business-process information obtaining step/operation may further comprise obtaining such information from the business in response to a single request or in a continually streaming form. Such business-process information step/operation may further comprise obtaining business operational information associated with at least one of transactions, backorders, cancelled orders, and service level agreement compliance associated with the business.

The technique of the invention may further comprise the step/operation of removing sensitive information from the business-process information.

In another aspect of the invention, a technique for providing a performance prediction service comprises obtaining a query from a potential customer of a business, and utilizing a performance estimation function in responding to the query obtained from the potential customer of the business, wherein the performance estimation function is generated based at least in part on business-process information obtained from the business.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustratively explained in further detail below, the present invention provides performance prediction techniques that are capable of using any real-time business or technical data, including the data used and/or processed by BAM products or other existing products such as are described above, in order to increase the accuracy of the predictions it produces.

One of the key challenges in the area of performance prediction is to make the performance predictions of a business operation, financial transaction, SLA compliance, or other significant transaction as accurate as possible.

Performance prediction methodologies disclosed in the U.S. patent application identified as Ser. No. 10/635,728 filed on Aug. 5, 2003 and entitled "Performance-prediction Service with Query-program Execution," and in the U.S. patent application identified as Ser. No. 10/317,300 filed on Dec. 12, 2002 and entitled "System and Method for Implementing Performance Prediction System that Incorporates Supply-chain Information," the disclosures of which are incorporated by reference herein, include gathering data on the satisfaction of parties in previous interactions with the party in question, processing this data in various ways, and weighing the data according to (for instance) how accurately the experiences of the particular reporting party have in the past reflected the success of future business interactions.

The present invention improves the accuracy of the predictions for a given prediction made by a performance prediction service, by gathering information from logs and other internal business-process information, rather than solely from satisfaction reports provided by prior customers and other participants.

More particularly, the present invention proposes a new performance prediction service that, in addition to post-fact reputation-related information, uses logs and other internal business-process information acquired from providers, in real-time or offline, to improve the business estimation service and consequently to provide consumers with more accurate estimate data.

In addition to helping a business to identify trustworthy partners, the inventive methodology allows users of the performance prediction service to identify partners that are most suitable to the business' particular needs, based on the information synthesized by the performance prediction service. For a business offering a service or a product, the practice of providing this kind of data to a performance prediction service may be a strong point in the business' offerings' advertisement.

In some implementations of the invention, a performance prediction service can give some or all of the actual data, typically (but not necessarily) "sanitized," to the consumers. In other implementations, the logs and different internal business-process information are used by the performance prediction service to improve the accuracy of its predictions, but are not made available to users of the service.

The business-process information provided to a performance prediction service may contain business operational data such as, for example, information about business transactions, backorder information, cancelled order information, SLA compliance logs, etc. In particular, such information may include the list of start and end times of all transactions performed during a calendar period, transactions volume, number of stopped, paused, failed, or successful transactions during the same or different calendar periods.

This data may be captured from the same applications that handle life-cycle business operations. In some implementations of the invention, the provided data is stripped of some or all sensitive information (e.g., information that could be used to identify particular customers, or that might be protected by privacy laws or policies) before being sent to the performance prediction service.

Businesses might be interested in providing their real-time operational data to a performance prediction service to raise their credentials and/or to establish a name for themselves, or simply to be able to report that they supply this information, and that they thereby show good faith and a desire to be evaluated fairly in the marketplace.

The following are some examples of how the real-time operational information sent by a business to a performance prediction service can be used by a potential business customer.

Potential buyer A is a mid-size business that is planning to order an item from a supplier twice a month. Buyer A has a problem with its present supplier of the item because it often places buyer A's orders on backorder. The present supplier does this when the item is being redesigned, or there is a shortage of goods needed to produce the item, or there is a sudden order increase for the item. Buyer A believes that his present vendor prefers buyers with high monetary volume or that it prioritizes buyers which order more frequently. Buyer A wants to select a supplier based on the ratio of supplier's back orders to the size and purchasing frequency of buyers. The performance prediction service, because it has data from the supplier's purchase orders and backorder records, can provide buyer A with a prediction of the back-order rates for various types of buyers for this part.

Next, assume a potential buyer is interested in how vendors handle cancelled orders and refunds. He is interested in knowing how the vendor's behavior depends on the buyer's power, location, volume of orders, etc. The performance prediction service gets real time data from the supplier's purchase order, cancellation, and refund record, and can satisfy various queries by the potential buyer, to aid the buyer in choosing vendors that have favorable behavior.

Further, assume a customer is interested in vendors' compliance with Service Level Agreements (SLAs) when providing services. Relevant information might include actual and goal values for response time, throughput, bandwidth, and so on. If there are policies that specify penalties for noncompliance (such as, for example, $x for every extra millisecond of response time), the amount of penalty paid during specified timeframes can also be part of the relevant data. A performance prediction service that has access to database or log records that reflect this SLA-related information can provide the customer with predictions of how likely the various vendors are to meet similar SLAs in the future.

Figure 1:
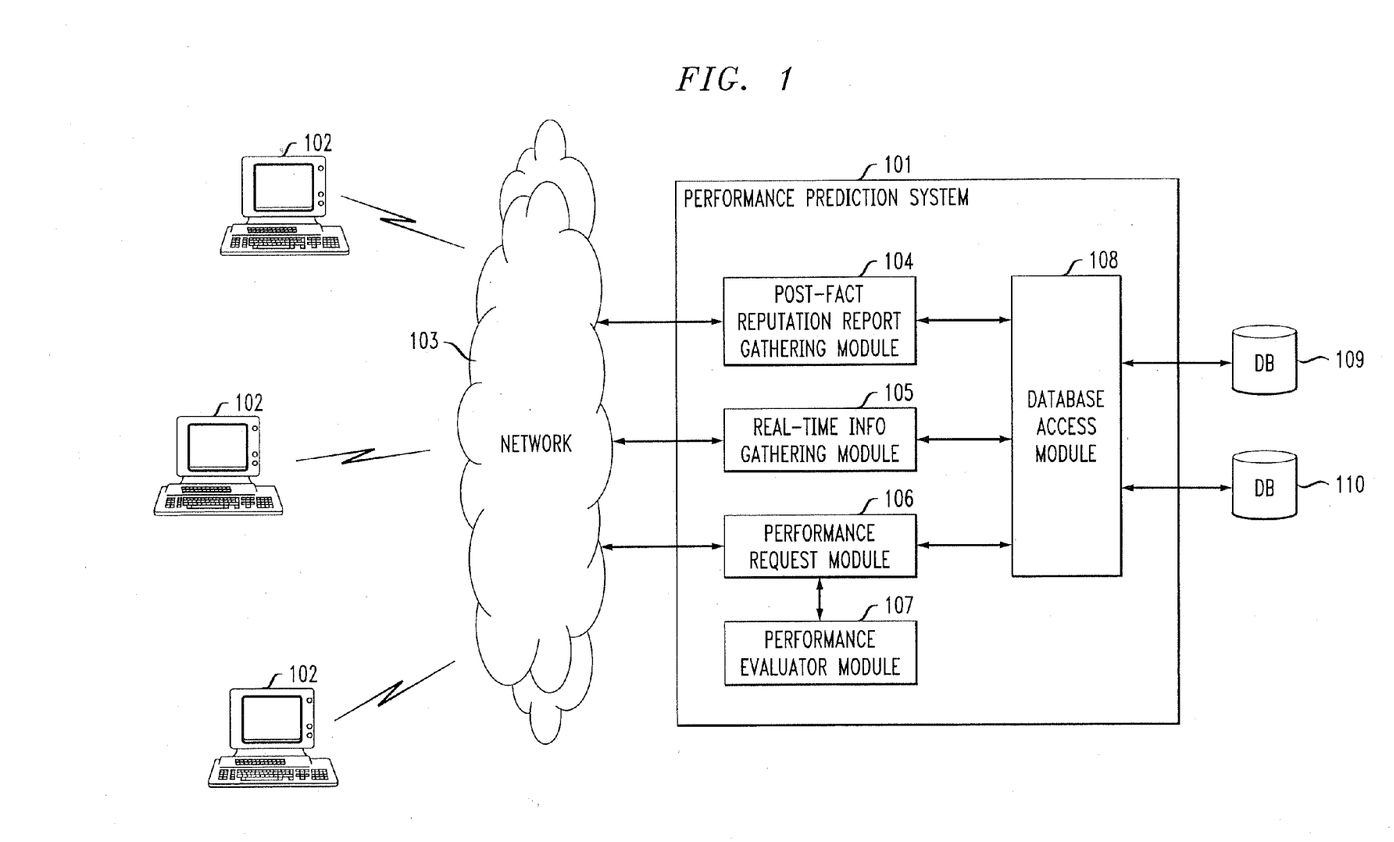
FIG. 1 is a diagram illustrating a performance prediction system, according to one embodiment of the present invention.

FIG. 1 illustrates an embodiment of a service implementing a performance prediction system, according to the present invention. In this embodiment, performance prediction system 101 communicates with clients 102 through a network 103, such as the global Internet. During operation of the service that system 101 provides, a client 102 submits a post-fact report of a transaction or other information on a business involved in the transaction to a post-fact reputation report gathering module 104. In this embodiment, system 101 also communicates with clients or automatically with clients' servers when real-time logs or any business-related information is submitted or streamed to real-time information gathering module 105.

It is to be understood that post-fact reports are sent by prior clients evaluating their partners' past performance, while real-time data is sent by businesses that are being evaluated. Post-fact reports and real-time information processed, or in a raw form depending on implementation, is stored in a database 109.

Performance prediction system 101 also includes a performance request module 106 coupled with performance evaluator module 107 and database access module 108 that is, in turn, coupled with database 109 (which stores post-fact reports and real-time information) and database 110 (which stores performance prediction data).

The performance evaluator 107 may employ existing algorithms that evaluate future performance based, for example, on a provider's performance history and performance history of its suppliers.

For example, well-known approaches such as data analytics used to uncover critical information, supply-chain prediction algorithms, statistical classification, predictive modeling and other methods mentioned below that are used in finance, engineering, and biological sciences can be used individually or in combination to evaluate future performance. Such exemplary methods that may be used are described in G. T. Albanis et al., "Five Classification Algorithms to Predict High Performance Stocks," 1999; H. Jonkers, "Application of Hybrid Modeling Techniques for Business Process Performance Analysis," 1997; and D. A. Bacigalupo et al., "Investigation into the Application of Different Performance Prediction Techniques to E-Commerce Applications," 2004, the disclosures of which are incorporated by reference herein. Also, prediction software available from Decision Craft Analytics Ltd. (Ahmedabad, India), Clockwork Solutions (Austin, Tex.), and those software products available from companies listed by "Software-x" on the World Wide Web, may be employed. It is to be understood that the invention is not limited to any particular performance evaluation and prediction techniques.

Figure 2:
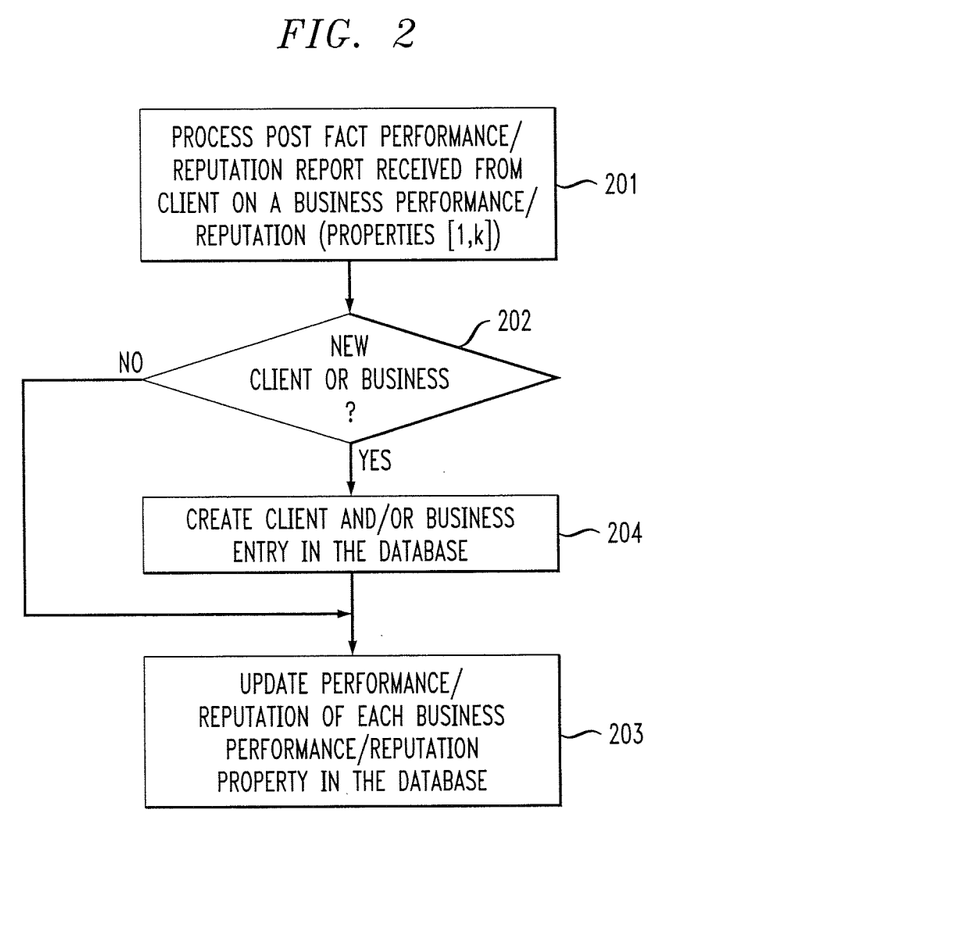
FIG. 2 is a diagram illustrating a post-fact reputation report gathering process, according to one embodiment of the present invention.

FIG. 2 is a logical flow diagram illustrating operations of post-fact reputation report gathering module (e.g., 104 in FIG. 1), according to an embodiment of the present invention. In step 201, a post-fact performance report is received on business transaction performance/reputation sent by prior clients. Buyers and clients can rate various properties (properties [1, k]) of transactions. Such properties may, for example, include price, durability, reliability, repair availability, service or parts availability, back-order handling, return processing, SLA compliance, etc. If a client or a business is new to the system, as determined in step 202, a new entry is created in the database, in step 204. If not a new client or business, the database records on a business and its transactions are created/updated, in step 203. It is to be appreciated that the estimation function may depend on any set of weighted identifiable parameters including real-time and/or post-fact data.

Figure 3:
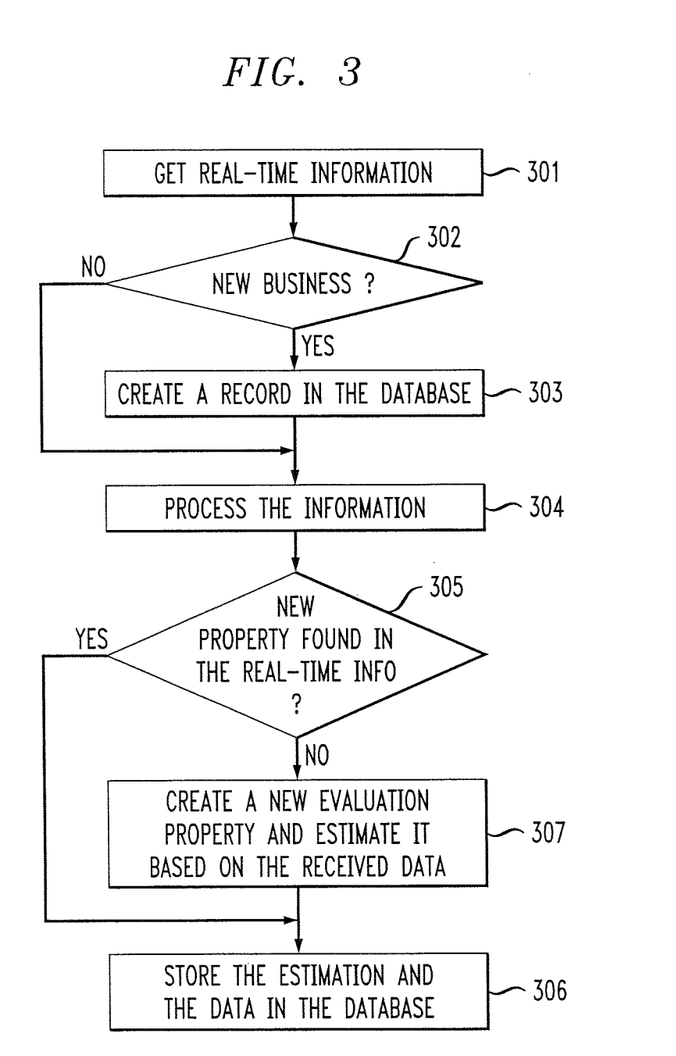
FIG. 3 is a diagram illustrating a real-time information gathering process, according to one embodiment of the present invention.

FIG. 3 is a logical flow diagram illustrating operations of a real-time information gathering module (e.g., 105 in FIG. 1), according to an embodiment of the present invention. As mentioned, the performance prediction service provided by system 101 uses real-time data in its estimation of reputation and performance prediction of businesses. Real-time information is sent or streamed to the service, in step 301. If the information is received from a new business, as determined in step 302, the information is recorded in the database. If not, a new record in the database is created, in step 304.

The received information is parsed, in step 304, on properties that can be evaluated. The properties are, in turn, checked against existing ones, in step 305. If they are new, they are recorded, in step 307, in the database. The estimation of a business as a whole is updated based on newly arrived data and the data stored, in step 306, to use for future performance prediction done on requests from customers.

Properties to estimate a business can include, for example, price, durability, reliability, repair availability, service or parts availability, back-order handling, return processing, SLA compliance, etc. The number of properties included in the estimation function can vary between requests. A simple estimation function can be a sum of weighted rates of properties divided by a number of properties.

Figure 4:
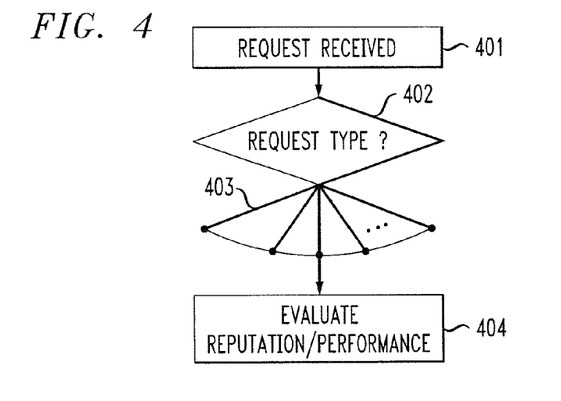
FIG. 4 is a diagram illustrating a performance request process, according to one embodiment of the present invention.

FIG. 4 is a logical flow diagram illustrating operations of a performance request module (e.g., 106 in FIG. 1). As mentioned above, the performance request module uses both post-fact reports and real-time data in generating an estimation of businesses' reputation and a performance prediction. When a request is received, in step 401, it is analyzed, in step 402, and different queries to the database are done, in step 403. Then, an estimation of a business as a whole or a performance prediction is generated, in step 404.

Figure 5:
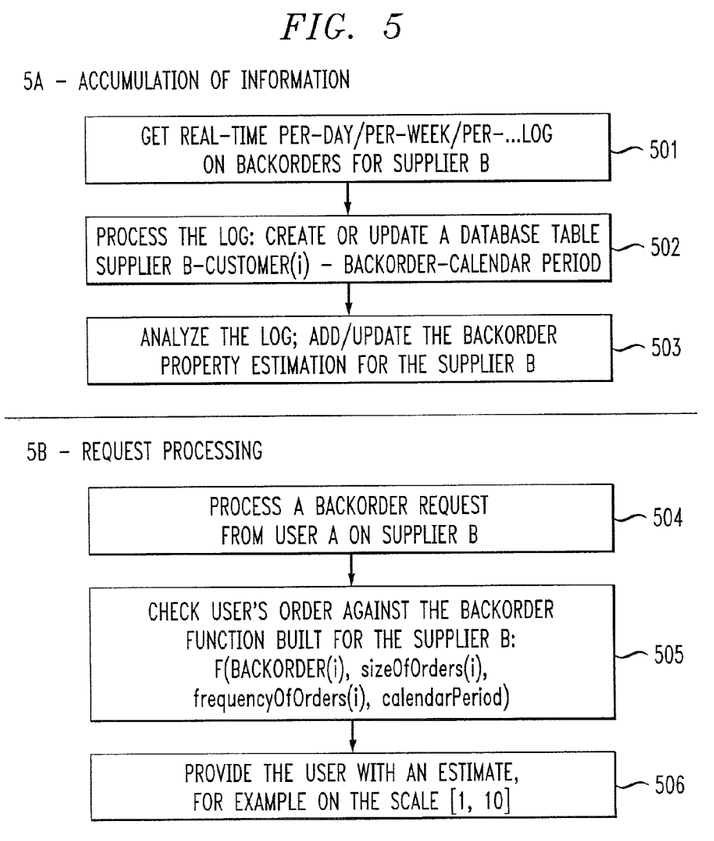
FIG. 5 is a diagram illustrating a performance estimation process, according to one embodiment of the present invention.

FIG. 5 is a logical flow diagram illustrating an example of performance estimation based on accumulated real-time information on a supplier's backorder history, according to an embodiment of the present invention. The specific example used is described above. Reference numeral 5A refers to the information accumulation stage, while reference numeral 5B refers to the request processing stage.

In the information accumulation stage, it is assumed that the supplier of particular goods sends its backorder logs to the performance prediction service associated with system 101. The log is received in step 501. The log may be a real-time per-day (or per-week, per-month, etc.) log on backorders for the supplier (e.g., supplier B). In step 502, the log is processed. That is, from the information in the log, a "supplier B—customer(i)—backorder—calendar period" database table is created (if new supplier) or updated (if existing supplier). In step 503, the log is analyzed, wherein the backorder property estimation for supplier B is added (if new supplier) or updated (if existing supplier) in the database.

When a potential customer A sends a request to the performance prediction service (in the request processing stage) regarding supplier B, customer A provides the service with the expected average volume of orders and the frequency of orders in a particular calendar period, in step 504. The customer's request is checked against the existing data, in step 505. More specifically, the user's request is checked against the backorder estimation function built for supplier B. In step 506, the user is provided with the estimate using the estimation function (shown in 505) of how likely the user's "profile" will fit with the supplier's provisioning pattern.

Figure 6A:
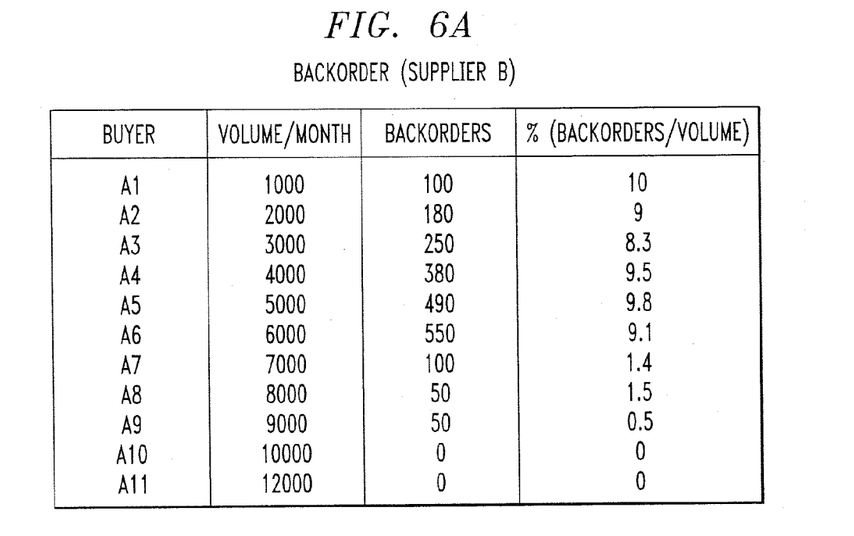
FIGS. 6A, 6B and 6C are diagrams illustrating an example of backorders associated with a supplier.
Figure 6B:
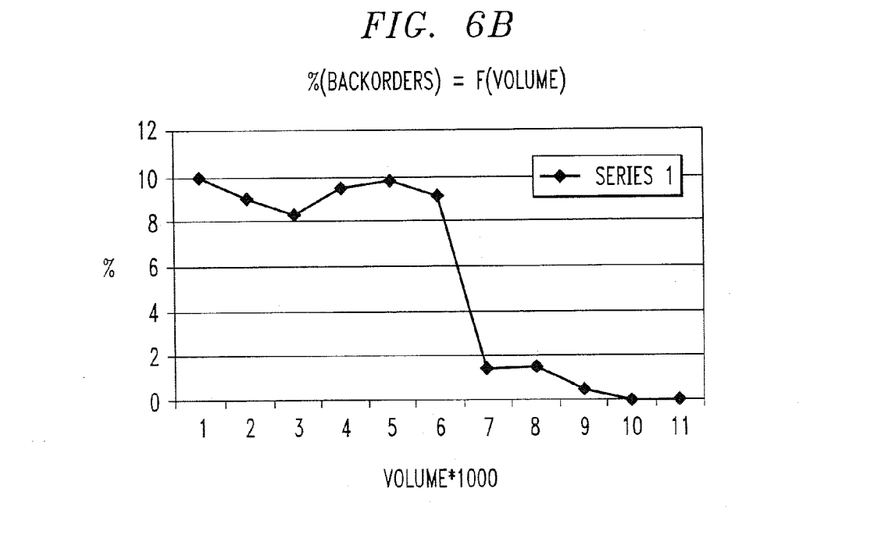
Figure 6C:
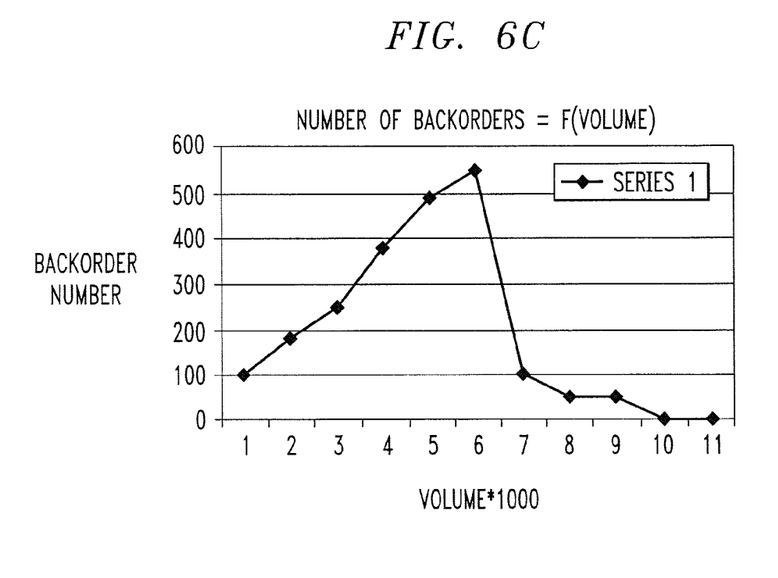

FIGS. 6A, 6B and 6C illustrate an example of backorders associated with supplier B. FIG. 6A is a backorder table showing buyers, volume per month, number of backorders, and backorders per volume (percentage). FIG. 6B plots the percentage (%) of backorders per volume. FIG. 6C plots the number of backorders versus volume.

The backorders data regarding supplier B shows that the % of backorders depends on the ordered volume (e.g., per month). Thus, if the volume is between [1000-6000], the % of backorders is approximately the same and is in the range of [8-10] %. As soon as the ordered volume reaches 7000 items (valuable customers), the percentage of backorders falls to 1.5% and gets 0% for volumes 10000 and higher. If customer A sends a request to the performance prediction service of the invention to evaluate the backorder number for his future order of 5500 items to a supplier B, the performance prediction service can predict that 550 items (~10%) will be backordered by this supplier. The performance prediction service can recommend customer A another supplier if available.

Advantageously, as illustratively explained above, the invention provides a performance prediction service that uses logs and other internal business-process information acquired from providers in real-time or offline in order to supply consumers of the service with more accurate performance prediction or estimate of the reputation of an existing or potential partner. Further, a business may serve as its own performance-prediction service provider, using log and other data to predict its own likely performance in potential transactions. The performance prediction service may give some or all of the actual data to its customers. At least some of the logs and other internal business-process information may be sent to the performance prediction service as a single response to a request. At least some of the logs and other internal business-process information may be written continuously to a server associated with the performance prediction service (e.g., system 101 of FIG. 1). As mentioned, data used by the system may comprise transaction history, SLA compliance logs, or any other relevant information suitable for performance analysis.

It is to be further appreciated that the present invention also comprises techniques for providing performance prediction services. By way of an example, a performance prediction service provider agrees (e.g., via a service level agreement or some informal agreement or arrangement) with a customer to provide performance prediction services. It is to be understood that the service customer may be a supplier seeking to have the service provider provide performance predictions relating to its business to requesting potential customers, or a service customer may be the requesting potential customer of the supplier. Then, based on terms of the service contract between the service provider and the customer, the service provider provides performance prediction services to the customer in accordance with one or more methodologies of the invention described herein.

Figure 7:
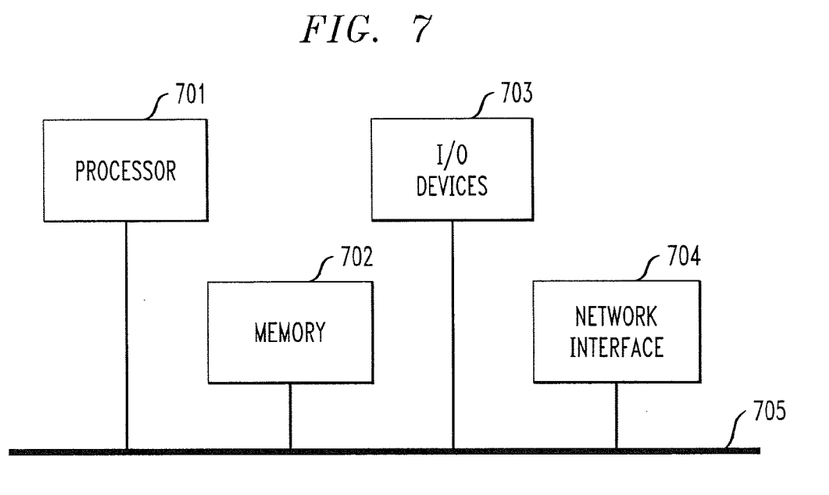
FIG. 7 is a diagram illustrating a computer system suitable for implementing a performance prediction system, according to one embodiment of the present invention.

FIG. 7 is a block diagram illustrating an illustrative hardware implementation of a computing system in accordance with which one or more modules/steps of a performance prediction system (e.g., modules and methodologies described in the context of FIGS. 1 through 6C) may be implemented, according to an embodiment of the present invention. It is to be understood that the individual modules/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 701, a memory 702, I/O devices 703, and a network interface 704, coupled via a computer bus 705 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-based method of providing a performance prediction service, comprising the steps of:

obtaining a query from a potential customer of an entity;

obtaining entity-process information associated with the entity, wherein the entity-process information comprises entity operational information associated with at least one of transactions, backorders, cancelled orders, and service level agreement compliance associated with the entity;

obtaining post-fact reputation information associated with the entity, wherein the post-fact reputation information comprises information regarding a performance history of past business transactions of the entity;

generating a performance estimation function based at least in part on the entity-process information and the post-fact reputation information; and utilizing the performance estimation function in responding to the query obtained from the potential customer of the entity to provide information regarding a reputation of the entity or a prediction of future performance of the entity;

wherein the obtaining, generating and utilizing steps are executed on a computing system comprising a processor and a memory, wherein one or more software components for implementing the obtaining, generating and utilizing steps are loaded from the memory and executed by the processor resulting in generation of a response to the query.

2. The method of claim 1, wherein the step of obtaining post-fact reputation information further comprises obtaining such information from one or more prior clients of the entity.

3. The method of claim 1, wherein the step of obtaining entity-process information further comprises obtaining such information from the entity in real-time or offline.

4. The method of claim 1, wherein the step of obtaining entity-process information further comprises obtaining such information from the entity in response to a single request or in a continually streaming form.

5. The method of claim 1, further comprising the step of removing sensitive information from the entity-process information.

6. Apparatus for providing a performance prediction service, comprising:

a memory; and at least one processor coupled to the memory and operative to:

obtain a query from a potential customer of an entity;

obtain entity-process information associated with the entity, wherein the entity-process information comprises entity operational information associated with at least one of transactions, backorders, cancelled orders, and service level agreement compliance associated with the entity;

obtain post-fact reputation information associated with the entity, wherein the post-fact reputation information comprises information regarding a performance history of past business transactions of the entity;

generate a performance estimation function based at least in part on the entity-process information and the post-fact reputation information; and utilize the performance estimation function in responding to the query obtained from the potential customer of the entity to provide information regarding a reputation of the entity or a prediction of future performance of the entity.

7. The apparatus of claim 6, wherein the operation of obtaining post-fact reputation information further comprises obtaining such information from one or more prior clients of the entity.

8. The apparatus of claim 6, wherein the operation of obtaining entity-process information further comprises obtaining such information from the entity in real-time or offline.

9. The apparatus of claim 6, wherein the operation of obtaining entity-process information further comprises obtaining such information from entity in response to a single request or in a continually streaming form.

10. The apparatus of claim 6, wherein the at least one processor is further operative to remove sensitive information from the entity-process information.

11. An article of manufacture for providing a performance prediction service, comprising a non-transitory computer readable storage medium containing one or more programs which when executed by a processor implement the steps of:

obtaining a query from a potential customer of an entity;

obtaining entity-process information associated with the entity, wherein the entity-process information comprises entity operational information associated with at least one of transactions, backorders, cancelled orders, and service level agreement compliance associated with the entity;

obtaining post-fact reputation information associated with the entity, wherein the post-fact reputation information comprises information regarding a performance history of past business transactions of the entity;

generating a performance estimation function based at least in part on the entity-process information and the post-fact reputation information; and utilizing the performance estimation function in responding to the query obtained from the potential customer of the entity to provide information regarding a reputation of the entity or a prediction of future performance of the entity;

wherein the obtaining, generating and utilizing steps are executed on a computing system comprising a processor and a memory, wherein one or more software components for implementing the obtaining, generating and utilizing steps are loaded from the memory and executed by the processor resulting in generation of a response to the query.

* * * * *